United States Patent Office 3,376,918
Patented Apr. 9, 1968

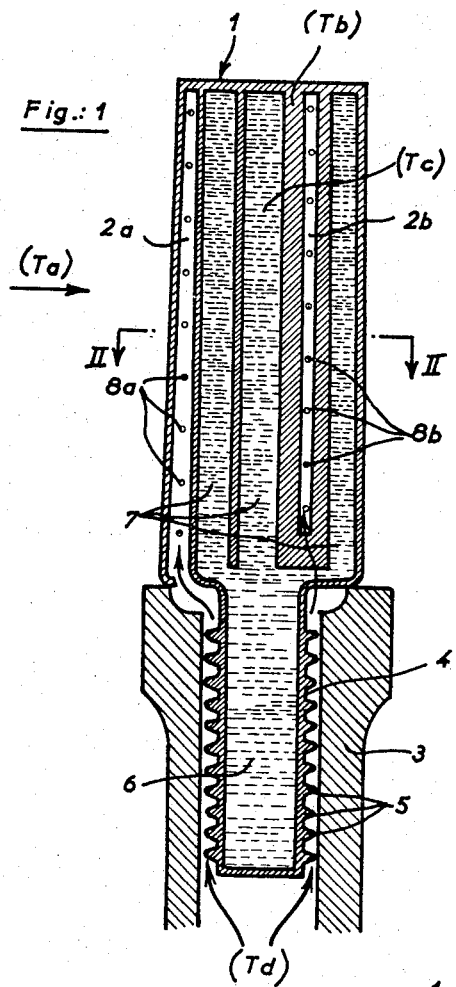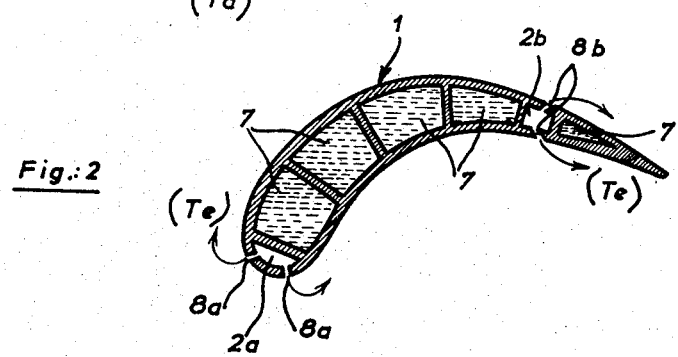

3,376,918
COOLING OF TURBINE BLADES
Claude Désiré Foure, Courbevoie, and Claude Henri Charles Moussez, Cachan, France, assignors to Societe Nationale d'Etude et de Construction de Moteurs d'Aviation, Paris, Seine, France
Filed July 20, 1966, Ser. No. 566,692
Claims priority, application France, Aug. 2, 1965, 26,954; June 23, 1966, 66,643
4 Claims. (Cl. 165—47)

ABSTRACT OF THE DISCLOSURE

A turbine blade having two kinds of internal passages in heat-exchange relationship formed within its body portion and respectively designed for the flow of two different heat-carrying fluids: (i) passages forming a liquid-tight closed circuit containing a heat-transferring liquid of high apparent thermal conductivity, and (ii) passages forming an open circuit supplied with a cooling gas, the latter leaking from the blade into the boundary layer in outside contact therewith through the region of the leading edge of this blade and also slightly upstream of its trailing edge.

---

The present invention relates to means for effecting the cooling of turbine blades or other movable blades subjected to high thermal constraints.

It is known that, the higher the temperature of the propulsion gases upstream of the turbine, the greater the efficiency and thrust (for a turbojet engine) or the output (for a gas turbine), but that the mechanical characteristics of the materials available for constituting these blades impose a practical upper limit on this temperature.

In order to maintain the blades at an acceptable working temperature, it is known to effect cooling thereof either by the internal circulation of a fluid or by the injection of a gas—preferably of relatively fresh air—into the boundary layer in contact with the blade. In the first case, the thermal energy to be dissipated and extracted increases with the difference between the temperature of the gases upstream of the turbine and the imposed limiting temperature that the blades must not exceed. In the second case, a limit is likewise set by the fraction of airflow that can be permitted to be withdrawn from the cycle for injection into the boundary layer, and in other respects the stability and uniformity of the temperatures in the protected blade are problematical.

A proposal has also been made to effect cooling of a blade by means of internal passages formed in the body of the blade, these passages being of two kinds intended to contain different fluids; on the one hand, fluids forming a leakproof closed circuit containing a substance which, under operating conditions of the blade, is a fluid with high apparent thermal conductivity and, on the other hand, passages forming an open circuit supplied with a cooling fluid which escapes from such circuit to selected zones on the surface of the blade.

Fluids which may be employed for the leakproof closed circuit are liquid metals, such as molten sodium, or liquids capable of being maintained in supercritical conditions, such as water or any organic liquid of the benzene type, whereas the cooling fluid may be air bled from the gas turbine compressor.

The passages of the closed circuit are arranged to permit a circulation—preferably natural (by convection and centrifugation)—of the fluid they contain, these passages being linked up in a leakproof manner to tubes, themselves leakproof, extending in the direction of the turbine axis, in housings provided for this purpose in the turbine disc. For their part, the open-circuit passages terminate in suitably located and orientated orifices, or porous surface portions of the blade.

The object of the present invention is to provide an improved arrangement of this known type for cooling a blade calling upon two fluids, such as air and a molten metal, the first-named circulating in an open circuit and the second in a closed circuit. It concerns improvements made in this kind of cooling arrangement with a view to rendering it at one and the same time more efficient and less wasteful.

In conformity with the present invention, the orifices or porous surface portions of the blade are located in the region of the leading edge of the said blade and slightly upstream of its trailing edge, and are so disposed that the air escaping from them, after having picked up a proportion of the heat from the molten metal circulating in the closed circuit, is utilised to constitute or reinforce the boundary layer in contact with the external surface of the blade.

The part played by the molten metal is to maintain the blade at a relatively uniform temperature which does not exceed a prescribed value (for instance, 850° centigrade); this result is obtained by transferring the heat, through the agency of the molten metal, from the head or top of the blade exposed to the hot combustion gases to the base of the said blade, where effective cooling can readily be arranged. For its part, the air does not only play a part as a cooling medium, which may be termed dynamic, through the absorption and extraction of heat calories emitted by the walls that are exposed to heat, but likewise a part as a thermal screen, which may be termed static, through the formation of a protecting boundary layer on the outer and the inner arching surface of the blade, this layer forming and interposing itself between the hot combustion gases and the body of the blade and hindering heat exchanges. By reason of this fact, a considerable temperature difference is established between the hot gases and the blade, now insulated in this manner by the protecting layer of air, this reducing the heating energy transferred towards the surface of the blade and, consequently, the amount of heat which flows from the head to the base and which it is required to extract.

In brief, the two fluids employed co-operate and react mutually to ensure the following combined functions:

A limitation in the transfer of heat from the combustion gases to the blade body by virtue of the protective screen constituted by the air issuing from the leading edge of the blade and reconstituted to the front of the trailing edge;

A standardization of the temperature of the blade and a transfer, towards the base, of the heat originating at the head by virtue of the molten metal the circulation of which is effected by natural convection assisted by the centrifugal field;

Extraction of the heat away from the blade by virtue of the internal circulation of the air before it is emitted through the orifices on the leading edge and upstream of the trailing edge, and heating-up of the said air being, moreover, of benefit to the first function mentioned, that of a protective screen.

These results can be considerably improved by judicious selection of the heat-transferring metal circulating within the closed circuit in the blade.

In conformity with another improvement brought about by the present invention, a heat-transferring metal is selected which is in a liquid state at the ambient temperature. By this means solidification is avoided when the engine is stopped and, as a consequence thereof, uneven running when the turbine disc is set in motion, as would be the case with the previously proposed sodium (melting point: 98°) or potassium (melting point: 64°).

A substance which has revealed itself as particularly important for this application as a heat-transferring metal is the sodium-potassium eutectic, which not only is liquid at the ambient temperature (melting temperature lower than −10°) but which remains in a liquid state at temperatures reached by the blade when actually operating. In this case, therefore, no alteration in the phase occurs, from liquid to vapour.

Circuits of such a liquid metal may be devised which have very modest dimensions and are in sealed capsules.

In the accompanying drawings:

FIGURE 1 is a diagrammatic longitudinal section through a blade according to the present invention, with the adjacent portion of the turbine disc to which it is attached.

FIGURE 2 is a cross-section through this blade on the line II—II in FIGURE 1.

The blade illustrated in the drawings at 1 is hollow and includes internal passages 2a, 2b which receive, through the agency of the turbine disc 3, compressed air bled from the turbine upstream of the combustion stage, preferably on a level with the last compressor stage, and led to the turbine disc 3 by way of the inside of the connecting shaft. This air circulates around an extension piece 4 of the blade which may be provided with ribs 5 and which constitutes the base of the blade embedded in the disc 3.

This extension piece 4 is hollow and bounds a leakproof internal tube 6 which communicates in a leakproof manner with other internal passages 7 in the blade 1 and which are likewise leakproof, the assembly 6–7 constituting a closed space which contains a liquid metal, of the sodium-potassium eutectic type or a supercritical liquid such as water, and one which is in heat exchange relationship with the air circulating inside the disc 3 and through the passage 2a, 2b of the blade. This air thus ensures the cooling of the blade as it itself heats up before being injected into the boundary layer to ensure the thermal projection of the blades, this injection being effected by way of the orifices 8a and 8b made in the region of the leading edge of the blade and slightly upstream of its trailing edge.

It will be noted that if $T_a$ is the temperature of the gas upstream of the turbine; $T_b$ the temperature, assumed as a first degree approximation, of the blade 1; $T_c$ the temperature, likewise assumed as a first degree approximation, of the fluid (boiling liquid metal or supercritical fluid) contained in the leakproof passages 7, $T_d$ the temperature of the air when it arrives in the turbine disc 3, $T_e$ the temperature of the air when heated up before injection into the boundary layer, then:

$$T_a > T_b > T_c > T_e > T_d$$

The various temperature gradients, surfaces and exchange coefficients may thus be defined.

It should be noted that it is not thermally equivalent, for a given fraction of the airflow for injection into the boundary layer, to employ it in a fresh state rather than after heating it from energy levied in the blade to be cooled. However, the protection conferred by injection into the boundary layer depends more on the thickness, hence on the volumetric flow, of the protecting boundary layer, than on its temperature difference from the temperature of the hot gases (which in any case remains high). Apart from this, it is known that it is difficult to maintain a uniform and stable temperature in the wall protected by a boundary layer. In the present case, all that is asked of boundary layer is to limit the heat energy exchanged, the maintaining of the temperature of the blade at an almost uniform temperature being effected by the very high apparent thermal conductivity of the internal fluid (liquid metal or supercritical fluid).

The trailing edge of the blade being of necessity thin, it will be difficult to ensure that it has good internal cooling; so at least a portion of the injection into the boundary layer will preferably be arranged in this region of the profile, the remainder being injected in the vicinity of the leading edge and affecting the whole of the blade.

What is claimed is:

1. A cooled turbine blade for use in a high-temperature flow, said blade having a hollow body portion comprising two kinds of internal passages in heat-exchange relationship and respectively designed to accommodate two different fluids, including first passages forming a liquid tight closed circuit containing a heat-transferring liquid of high apparent thermal conductivity, and second passages forming an open circuit to be supplied with a cooling gas, said body portion including means affording communication between said second passages and the outer surface of said blade whereby said gas leaks from the blade into the boundary layer of said high-temperature flow on said blade, said last means being located in the region of the leading edge of the blade and also slightly upstream of the trailing edge thereof.

2. Turbine blade as claimed in claim 1 wherein said liquid is a metal which is in a liquid state at ambient temperature.

3. Turbine blade as claimed in claim 2, wherein said metal is in a liquid state without vapor phase at operative temperature of said blade.

4. Turbine blade as claimed in claim 3, wherein said liquid metal is the sodium-potassium eutectic.

References Cited

UNITED STATES PATENTS 3,266,564    8/1966    Sabatiuk ———————— 165—86

ROBERT A. O'LEARY, *Primary Examiner.*

C. SUKALO, *Assistant Examiner.*